(12) United States Patent
Fegley et al.

(10) Patent No.: US 7,005,763 B2
(45) Date of Patent: Feb. 28, 2006

(54) RECONFIGURABLE SIGNAL DISTRIBUTION SYSTEM

(75) Inventors: Jeffrey J. Fegley, Camp Hill, PA (US); Matthew T. Miller, Harrisburg, PA (US); Larry E. Dittmann, Middletown, PA (US); William H. Bair, Mechanicsburg, PA (US)

(73) Assignee: Yazaki North America, Inc., Canton, MI (US)

( * ) Notice: Subject to any disclaimer, the term of this patent is extended or adjusted under 35 U.S.C. 154(b) by 551 days.

(21) Appl. No.: 10/087,892

(22) Filed: Feb. 28, 2002

(65) Prior Publication Data

US 2002/0131260 A1 Sep. 19, 2002

Related U.S. Application Data

(63) Continuation-in-part of application No. 09/796,963, filed on Mar. 1, 2001, now Pat. No. 6,791,213.

(51) Int. Cl.
*H01H 9/02* (2006.01)

(52) U.S. Cl. .................... 307/146; 307/147
(58) Field of Classification Search .......... 307/147, 307/146; 439/215, 225
See application file for complete search history.

(56) References Cited

U.S. PATENT DOCUMENTS

| 3,359,460 | A | | 12/1967 | Ragone et al. ............. 317/99 |
| 5,034,808 | A | | 7/1991 | Murray .................... 358/86 |
| 5,267,305 | A | * | 11/1993 | Prohs et al. ............. 379/233 |
| 5,727,055 | A | * | 3/1998 | Ivie et al. ............... 379/156 |
| 5,761,320 | A | | 6/1998 | Farinelli et al. .......... 381/81 |
| 6,535,602 | B1 | * | 3/2003 | Jennison ................. 379/326 |

FOREIGN PATENT DOCUMENTS

WO     WO98/25416     6/1998

* cited by examiner

*Primary Examiner*—Robert L. Deberadinis
(74) *Attorney, Agent, or Firm*—Barley Snyder, LLC

(57) ABSTRACT

The invention provides a modular distribution system having central distribution panel for receiving a plurality of services at an input and having a plurality of outputs each connected to an outlet at a remote location. A central region is provided in the central distribution panel having a plurality of module receiving connectors each having a first portion connected to the input and a second portion connected to one of the plurality of outlets. A plurality of modules are each separately connectable to a respective module receiving connector and configured to bridge a selected service from the first portion of the module receiving connector to the second portion of the module receiving connector.

29 Claims, 6 Drawing Sheets

RECONFIGURABLE SIGNAL DISTRIBUTION SYSTEM

This is a continuation in part of application Ser. No. 09/796,963, filed Mar. 1, 2001, now U.S. Pat. No. 6,791,213.

FIELD OF THE INVENTION

This invention is related to a signal distribution system, and more particularly to a reconfigurable distribution system for distributing multiple services into a premises to a plurality of locations within the premises.

BACKGROUND OF THE INVENTION

Homes and other buildings are currently being constructed with the use of structured wiring systems wherein a structured wiring network is configured to distribute a plurality of services coming into the premises such as telephone, audio, television, data, satellite and other services throughout the premises. These services typically enter the premises at a central location such as through an outside wall into the basement or a wiring closet. Through the use of one or several central distribution channels, the signals are divided and distributed to the desired rooms within the premises. A typical structured wiring system is shown schematically in FIG. 1. In this system, video, audio, telephone, data, cable TV and any other desired services are fed into the central distribution box 10 from outside or inside the premises. Within the central distribution box 10, panels are typically utilized for dividing these incoming services into subsets for distribution to various rooms 12, 14, 16 within the premises. The distribution to each room is accomplished through a structured wiring network consisting of the variety of cables selected form the set of unshielded twisted pair, shielded twisted pair, RG6 coaxial cable, optical fibers, or other conductors. For example, video may be distributed from the central distribution box 10 to the master bedroom 16, over an RG6 coaxial cable 20. Likewise, a video source such as a security camera or video cassette recorder may feed signals from a room such as the master bedroom 16 to the central distribution box 10 over an RG6 coaxial cable 30 for distribution out of the central distribution box 10 to other rooms 12, 14. Likewise, an audio source may be fed from any room 12, 14, 16 to the central distribution box over a two pair copper conductor 22 for further distribution into all rooms of the premises. Telephone services may be distributed over unshielded twisted pair cable 24 from the central distribution box 10 to the master bedroom 16 or any other room in the house. Likewise, data may be transmitted over suitable cables such as an unshielded twisted pair, shielded twisted pair, coaxial cable, or a fiber optic cable 26 from the central distribution box 10 to any room in the premises such as the master bedroom 16.

U.S. Pat. Nos. 5,130,893 and 5,327,114 disclose a signal distribution system which provides one location for telephone/audio and video service entrance and distribution throughout a home. Enclosures are provided for a distribution center capable of distributing power along with these services. The distribution center has terminations for services entering the facility, connectors coupled to the distribution network each connecting a respective outlet within the home to the distribution center, and a programming card for directing selected services to selected connectors coupled to the distribution network. The distribution network as shown in the prior art of FIG. 1 includes coaxial or twisted pair cable designed to deliver the services to each wall termination within rooms of the home.

Several problems exist with these patents and a current state-of-the-art. First, these structured wiring systems are generally terminated utilizing insulation displacement contact (IDC) type termination within the central distribution box and similar electrical connectors within each wall outlet in the rooms of the premises. This arrangement essentially creates a hardwired semi-permanent interconnection system for the network. In order to reconfigure the network to provide a change in which service will be directed to which outlet of the premises, re-termination at the central distribution box and/or within each room is required and possibly new wiring may be required. Although a signal distribution system as disclosed in the above-referenced patents does provide a programming card utilized for directing selected inputs to selected outputs within the central distribution box, it is limited to the distribution of video or voice services. The flexibility of that system is also limited in that the programming card may be preprogrammed for a desired input to output relationship for the entire set of outputs or may consist of an alternate programming card which allows some variability in selecting input to output relationships. In either of the programming card embodiments, the user must either select from a previously programmed arrangement or require technical assistance in creating a separate programmed input to output relationship.

What is needed is a distribution system that would allow for a transfer of data services through a hub or other suitable data distribution device, in addition to the transfer of video, voice, satellite transmissions or any other service. Additionally, it is desirable to have a system whereby a user can simply reconfigure the input output relationship without further technical assistance.

SUMMARY

It is therefore an object of this invention to provide a modular distribution system having central distribution panel for receiving a plurality of services at an input and having a plurality of outputs each connected to an outlet at a remote location. A central region is provided in the central distribution panel having a plurality of module receiving connectors each having a first portion connected to the input and a second portion connected to one of the plurality of outlets. A plurality of modules are each separately connectable to a respective module receiving connector and configured to bridge a selected service from the first portion of the module receiving connector to the second portion of the module receiving connector.

BRIEF DESCRIPTION OF THE DRAWINGS

The invention will now be described by way of example with reference to the accompanying figures of which.

DETAILED DESCRIPTION OF THE INVENTION

Figure 1:
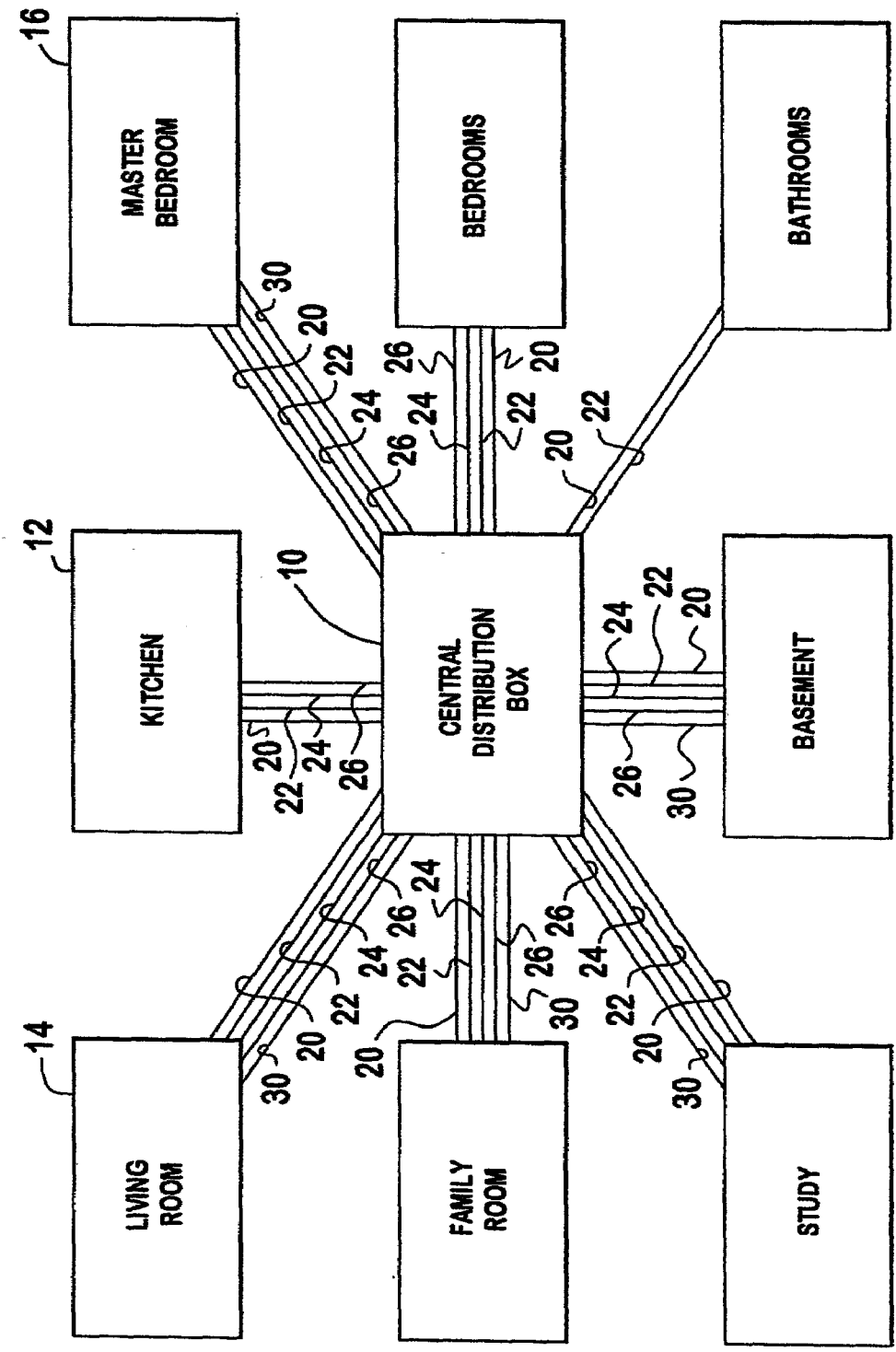
FIG. 1 is a block diagram of a prior art structured wiring distribution system.
Figure 2:
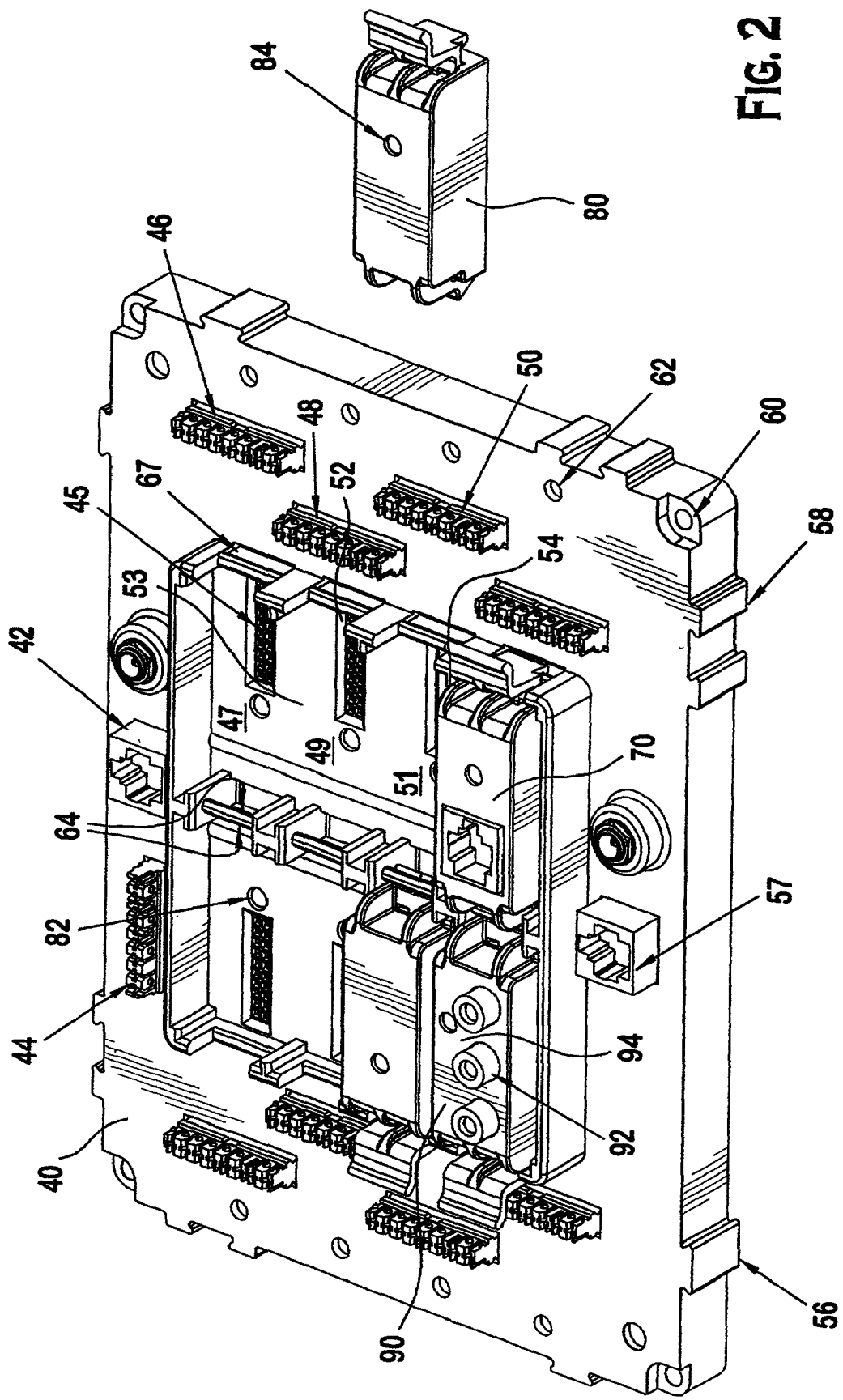
FIG. 2 is a three-dimensional view of the distribution panel according to the present invention.

The invention will be now be described in greater detail first with reference to FIGS. 1 and 2. The system of the present invention utilizes a structured wiring system as shown in FIG. 1 and described above. This system typically features a structured wiring network connected to a central distribution box 10 which receives a plurality of services into a premises and distributes selected services to selected rooms within the premises. These services may include but are not limited to video, audio, voice, data, firewall or smart device control. Additionally, these services may enter the premises over a variety of media such as any electrical conductor, optical conductor or over a wireless communication link. Turning now to FIG. 2, a distribution panel 40 for use in the central distribution box 10 and/or other suitable enclosure is shown. The distribution panel 40 may be formed of a molding material or a suitable substrate such as a printed circuit board for carrying electrical signals. This distribution panel 40 is configured to receive the plurality of services at a first input connector 44 or a second input connector 42. The first input connector 44 provides insulation displacement contact (IDC) terminations while the second input connector 42 provides modular Jack type terminations. In the event that a service is provided on a non-electrical media such as optical or wireless, a transducer is utilized to convert the service to an electrical input signal for connection to one of the input connectors 42, 44. The input services provided to each of these input connectors 44, 42 are electrically connected to module connectors 45, 52, 54 positioned within a central region 53. Each module connector 44, 52, 54 is also electrically connected to a respective output connector 46, 48, 50. Alternatively, any one of the output connectors 46, 48, 50 could be used as an input for a service. In this arrangement, an input module would be placed in a respective module receiving section 47, 49, 51 which will be described in greater detail below.

The central region 53 provides securing means for properly positioning modules 70,80,90. The securing means preferably includes a projection 64 formed in a first wall and a shoulder 67 formed in a second wall opposite the first wall. It should be understood however by those reasonably skilled in the art that other securing features would be suitable to form the securing means. Each module connector 44, 52, 54 is positioned between the projection 64 and the shoulder 67. It should be understood by those reasonably skilled in the art that while the module receiving sections are labeled as 47,49,51 and the corresponding module connectors are labeled as 45, 52, 54, the number and arrangement of these components may vary depending upon the requirements of a particular application. It should also be noted that for each module receiving section, there is a corresponding module connector and output connector. For example, the module receiving section 47 corresponds with the module connector 45 and the output connector 46. Likewise, the module receiving section 49 corresponds with the module connector 52 and the output connector 48. This relationship and arrangement similarly applies to each of the remaining module receiving sections, module connectors, and output connectors. The electrical connections between these components will be described in greater detail below. A plurality of tie receiving bosses 62 are also provided opposite each output connector 46, 48, 50. Alternatively, any suitable fastening device such as a lug or opening for a tie may be utilized in place of the tie receiving boss 62. Mounting openings 60 are provided along edges of the distribution panel 40. A distribution connector 57 is electrically connected to the first and second input connectors 42, 44 and is positioned near the central region 53. A power connector may optionally be provided to power active components housed within selected modules. Power from this connector is distributed into the central region for connection to selected modules.

Figure 3:
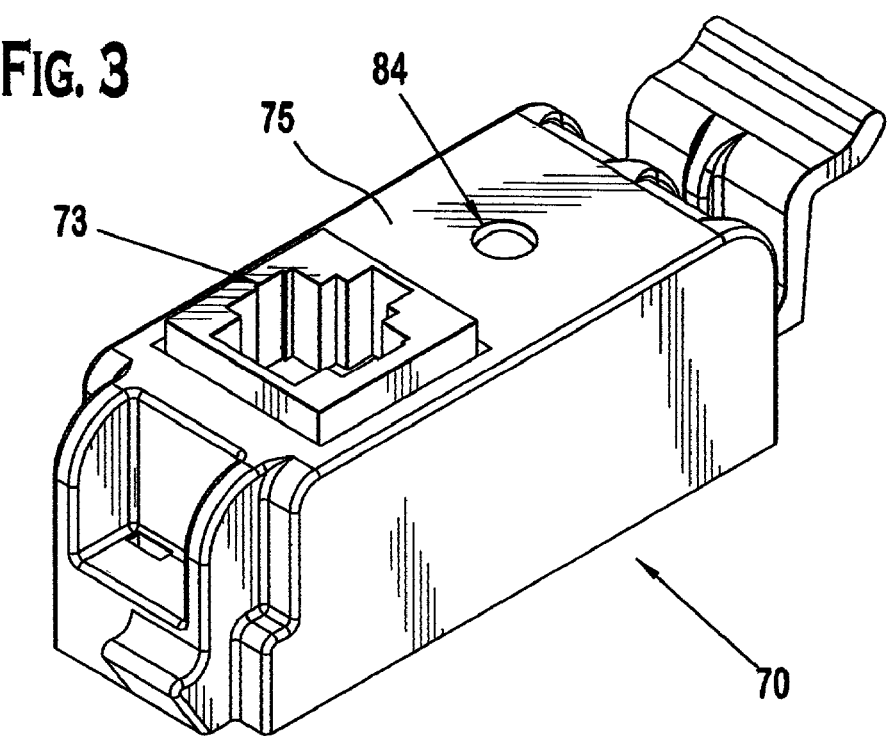
FIGS. 3 and 4 are three-dimensional views of the data module according to the present invention.
Figure 4:
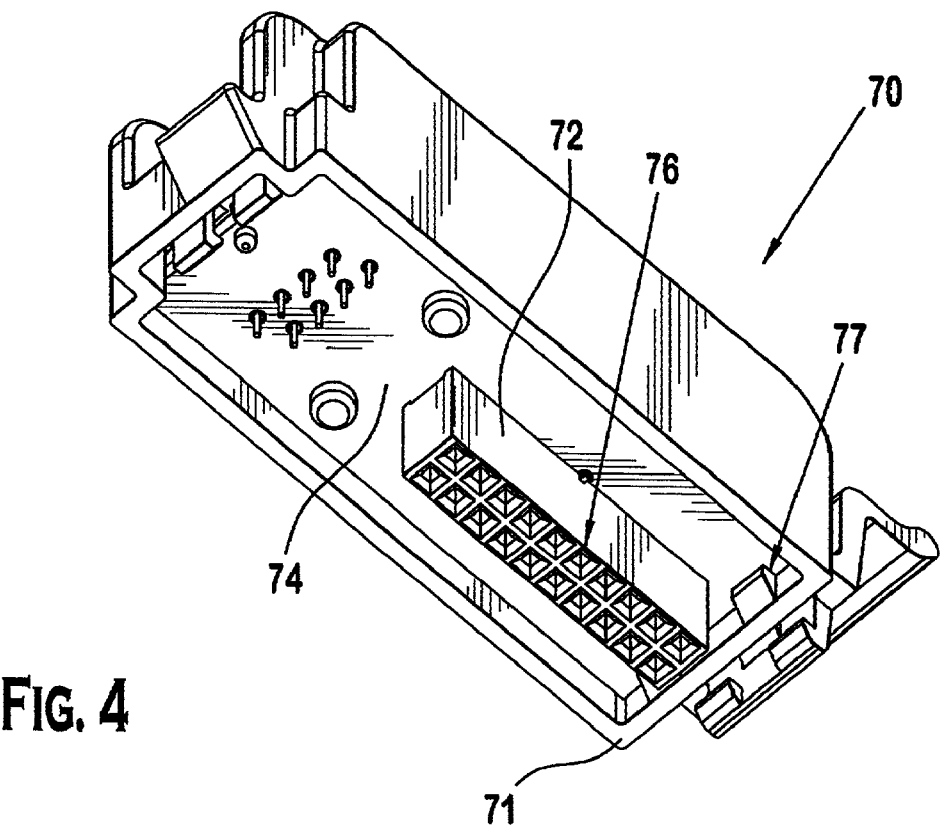

Each module 70, 80, 90 will now be described in greater detail with reference to FIGS. 2 and 3. Referring first to FIG. 3, a data line module 70 is shown. This data line module 70 has a circuit board 74 positioned within a housing 78. The housing 78 features a pair of latch projections 77 protruding from the bottom surface 71 near the circuit board 74 and a latch 79 extending upward from the bottom surface 71 upward toward the front face 75 on one side. A mating connector 72 extends outward from and is positioned on the circuit board 74. A plurality of contact receiving cavities 76 are provided in the mating connector 72. It should be understood by those reasonably skilled in the art that although the mating connector 72 shown here is a female connector having contact receiving cavities 76 aligned in two rows, other suitable electrical connectors may be positioned along the circuit board 74 for providing the same electrical connection function. Along the front face 75, a receptacle connector 73 is disposed. The receptacle connector 73 is preferably a modular jack receptacle, however it should be understood by those reasonably skilled in the art that other receptacle connector arrangements are possible along the front face 75. This module 70 is electrically configured to pass data signals from the first input connector 42 through the module connector 45, through the mating connector 72, to the receptacle 73. An alternate data line module 70 may incorporate an optoelectronic transducer whereby electrical signals are received by the mating connector 72 as an input to the optoelectronic transducer. The optoelectronic transducer has an optical output which is provided to a suitable optical connector which would replace the receptacle 73. This alternate data line module would provide fiber out to a selected distribution device located near the distribution panel 40 or to a selected room in the premises.

The telephone line module 80 is shown in FIG. 2 and features the same latch projections 77 and latch 79 arrangement for securing the module within a module receiving section 47, 49, 51. The telephone line module 80 is configured to pass a selected telephone line from the input connectors 44, 42 through a selected module connector 45, 52, 54 to a selected output connector 46, 48, 50. It should be understood by those reasonably skilled in the art that the telephone line module 80 may be adaptable to pass any one of the incoming telephone lines to the selected output connector 46, 48, 50.

The video module 90 is also shown in FIG. 2 and features the same latch projections 77 and latch 79 arrangement for securing the module 90 within a module receiving section 47,49, 51. The video module 90 is configured like the data line module 70 to pass a selected video line from the input connector 44 through a module connector 45, 52, 54, through the mating connector 72 and then through electrical connectors 92 positioned on the front face 94 of the module 90. These electrical connectors 92 are preferably RCA jack type connectors however, other suitable connectors for passing video signals could alternatively be utilized on the front face 94 of the video module 90. The video module is configured to convert and/or transmit video signals and therefore may include active components comprising tuner circuits, filtering circuits, or other video circuits. Each of the modules 70, 80, 90 also contains a light indicator which is powered when the module is correctly inserted and fully seated on it's respective module connector 46, 48, 50. A plurality of light indicators are also present in the central region to indicate that a respective module receiving section 47, 49, 51 is empty. This indicator is covered when a module is inserted and powered.

While modules have been described above for passing data, voice, or video signals, a module similar to the video module 90 may be provided for passing audio signals. Alternatively, a combination module may be provided for passing multiple services such as, video and voice or telephone. The combination module may provide the combined services over a single line to a room. Within the room a splitter is provided to divide the combined services for example video and audio. Such a combined signal may also be provided across a hybrid communications medium such as a cable containing both electrical and optical conductors in which case a splitter may not be necessary in the room because selected signals can be electrically coupled to the electrical conductors while other selected services could be optically coupled to the optical conductor. Additionally, the data line module or an additional panel may incorporate hardware and/or software to be utilized as a firewall for protection of a local area network within the premises. These modules or similar modules may also incorporate smart device controls for allowing either wireless or wired control of appliances or control of other systems such as a security system or HVAC system or lighting system within the home. Any of the described modules or a separate module may also incorporate a surge supressor for providing signal protection services throughout the system.

Figure 5:
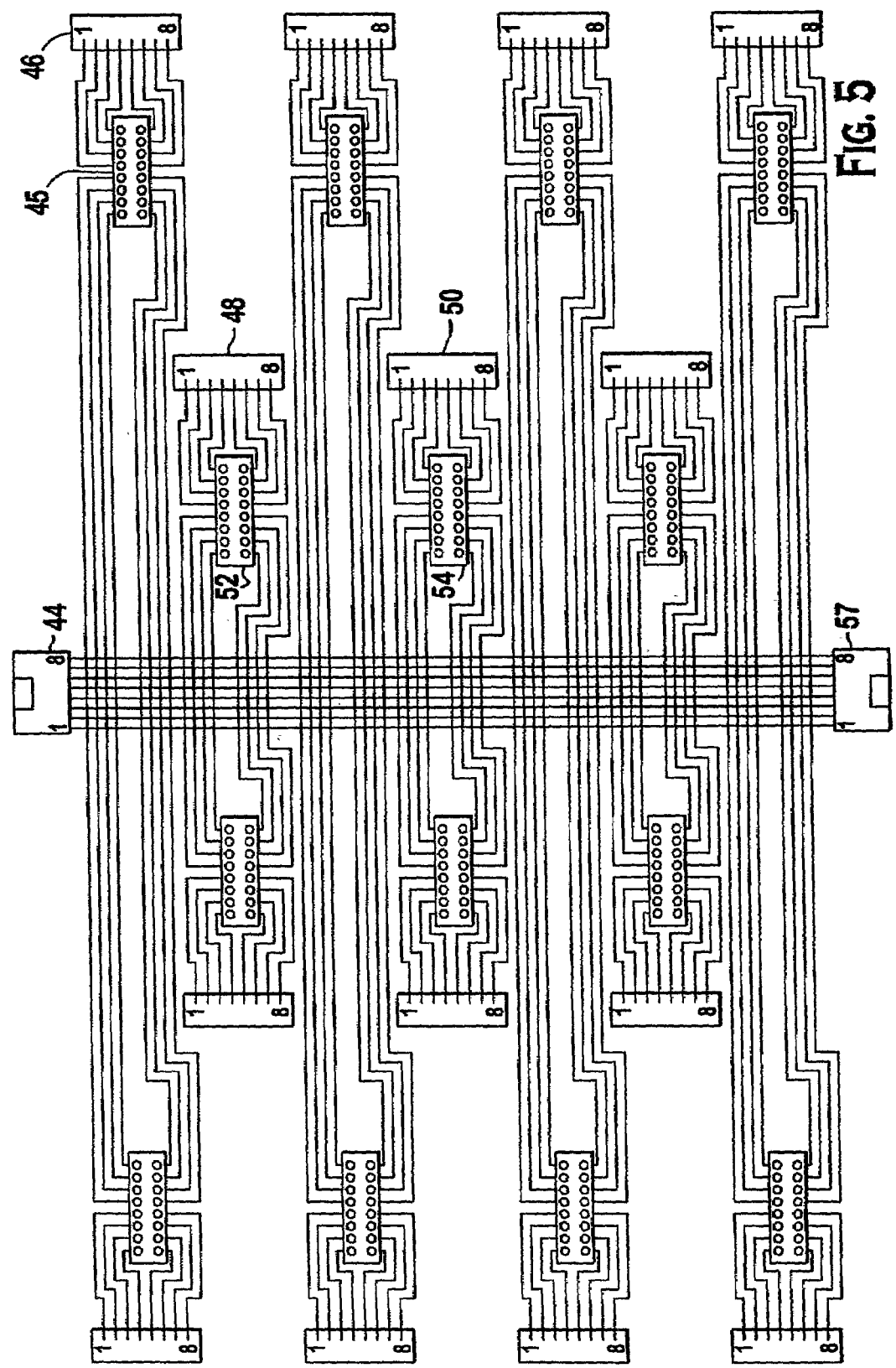
FIG. 5 is a schematic representation of the wiring of the distribution panel shown in FIG. 2.

Turning now to FIG. 5 the electrical arrangement of the distribution panel 40 is shown schematically. This electrical arrangement is preferably accomplished utilizing a printed circuit board for connecting through holes receiving pins from each of the electrical connectors 44, 45, 46, 48, 50, 52, 54 mounted on the board. Each input connector 44 is capable of receiving either a single telephone line or a plurality of telephone lines designated as line 1,line 2,line 3 etc. The interconnection arrangement shows that the input connector 44 is connected to one half of each of the module connectors 45, 52, 54. Each of the module connectors 45, 52, 54 consists of the first input half for receiving traces from the input connector 44 and a second output half for connection to a respective output connector 46, 48, 50. Insertion of a module 70, 80, 90 therefore provides a bridge between the first input half and the second output half of the module connector 45, 52, 54. It should be understood however that each module 70, 80, 90 may selectively connect pins on the first input half to selected pins on the second output half. Each module 70, 80, 90 is therefore coded and configured for connection of the desired input to the desired output. Distinguishing visual features may be applied to each module so that the user understands which module will pass which desired input, for example line 1,line 2,etc. to the output connector 46, 48, 50.

Figure 6:
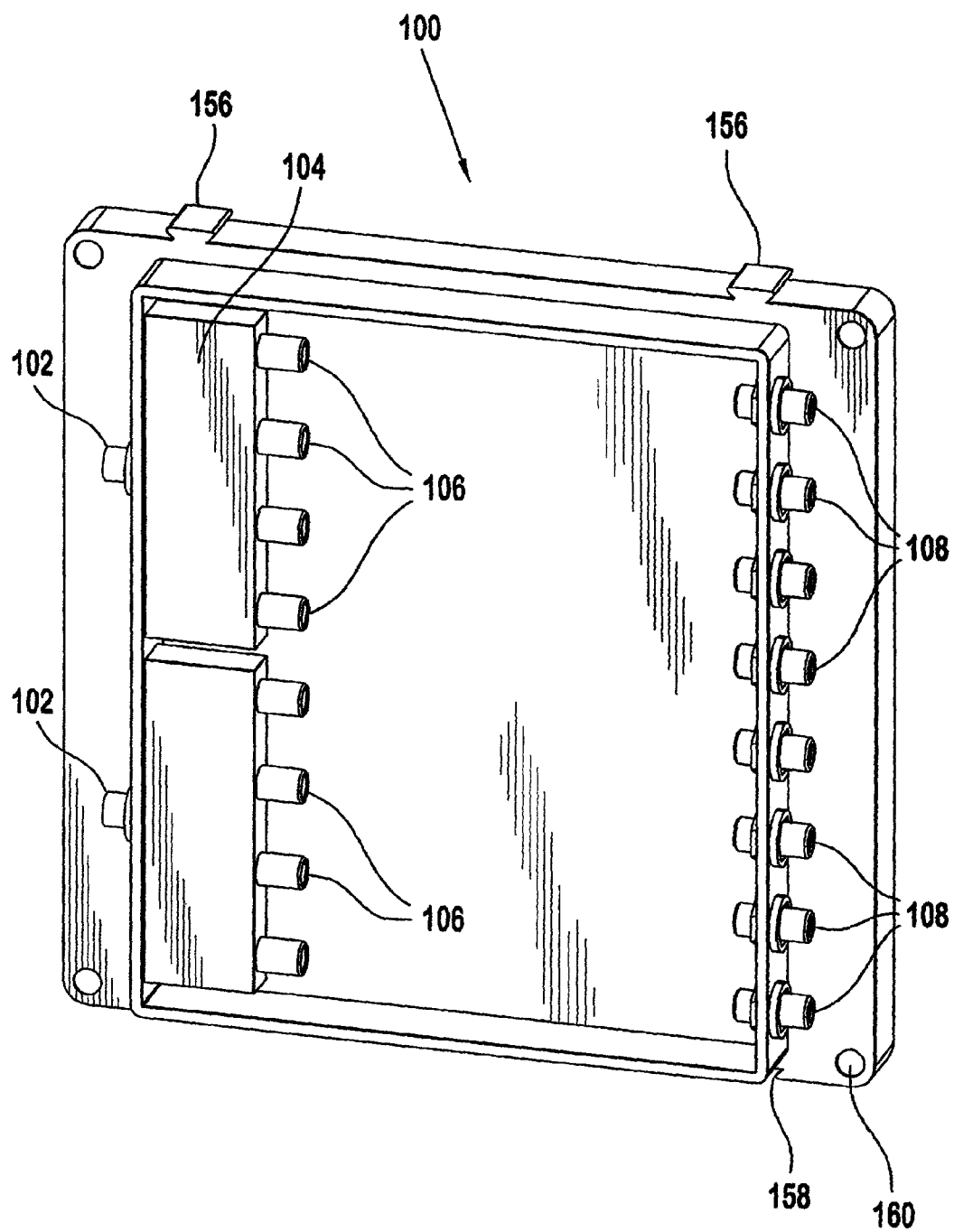
FIG. 6 is a three-dimensional view of the video distribution panel according to the present invention.

Referring to FIG. 6, the video distribution panel 100 is shown. This panel 100 is configured to a have tongue 156 and groove 158 features along with mounting openings 160. It is configured to receive video or audio inputs at input connector 102 into a splitter 104 for distribution to a plurality of output connectors 106. The video signal is received at the input connector from one of the connectors 92 on the front face 94 of the video module 90 within the distribution panel 40. Second output connectors 108 serve to connect output 106 to cables within the distribution network to rooms in the premises. Various video components such as amplifiers or modulators may be placed in the circuit between output connectors 106 and 108 or may be hard wired therein eliminating the need for either connectors 106 or connectors 108. Alternatively, such components including amplifiers, modulators, filters or other video components may be placed within the video module 90. Video signals may flow bidirectionally through this circuit arrangement. For example, video signals may be generated throughout various rooms within the premises and pass from a respective row through a structured wiring network into the video module 90 and then to the video distribution panel 100 for redistribution to all rooms within the network. Alternatively, video source signals may enter from a service entrance into the distribution panel 40 and then passed through a video module 90 to the video distribution panel 100 for further distribution to each room in the premises. Alternatively, if the video distribution module 90 includes active components to for a modulator, video signals may be input directly to the module 90 without passing through the video distribution panel 100. Distribution through the premises may be accomplished utilizing unshielded twisted pair cable, coaxial cable or other suitable video signal conductors.

Figure 7:
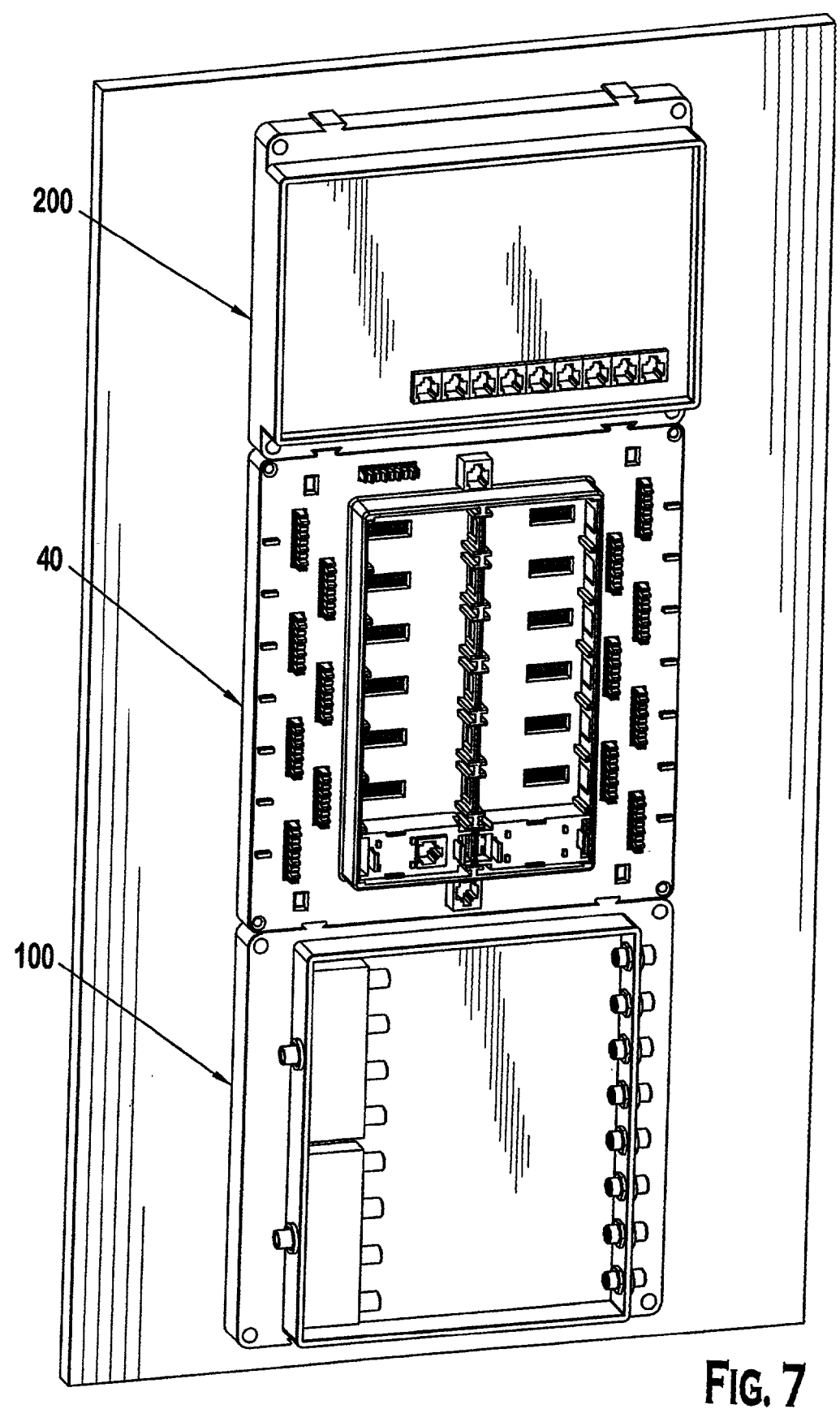
FIG. 7 is a three-dimensional view of the distribution system including the panels of FIGS. 2 and 5.

FIG. 7 shows a central distribution system according to the present invention whereby the video distribution panel 100 described above with reference to FIG. 6 and the distribution panel 40 described above with reference to FIG. 2 are interconnected utilizing the tongue and groove features. Additionally, a data distribution panel 200 is similarly joined to the distribution panel 40. The data distribution panel 200 is preferably a hub or other suitable data distribution device for a data network. The data distribution device is connectable to the receptacle 73 of a data line module 70 to facilitate bidirectional data communications between the data service input at a hub or other suitable data distribution device and the rooms of a promises. This circuit extends first from the hub then through the cable to a desired data line module 70, then through a selected module connector 45, 52, 54 to a selected output connector 46, 48, 50.

Another alternative module which is not shown is a security module. The security module is connectable in a module receiving section 47, 49, 51 and is capable of connecting to a security panel through a connector on it's front face and also capable of seizing line 1 when the security panel detects a security breach. This security module may also be linked to smart devices such as lighting controls or other sensors in the premises to detect a security breach. It may also receive input from remote control devices such as a personal wireless emergency call device.

In operation, the user identifies an output connector 46, 48, 50 associated with a given room or receptacle within the room of a premises. The user then decides which service, for example telephone line 1 or line 2, data, or video, is to be passed to the selected room. The coded module 70, 80, 90 for the selected service is simply inserted into the module receiving section 47,49, 51 associated with the desired output connector 46, 48, 50 associated with the selected room to complete the installation. If the user later decides to change the service being passed to the selected room, they simply change the module in the appropriate module receiving section 47,49, 51 to supply the new desired service to that room.

An advantage of the present invention is that by simply changing a module, a user may redirect selected services to selected rooms within a premises without the need for any re-wiring or re-termination of wires within the structured wiring network. Since each module is easily insertable and removable from its appropriate module receiving section, the reconfiguration of the system may be accomplished by a homeowner without the need for additional technical assistance.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A signal distribution system having a structured wiring network extending between rooms of a premises and connected to a central distribution unit capable of receiving a plurality of services from outside or inside the premises, the system comprising:
   a central distribution panel having at least one input electrical connector for receiving a service, a plurality of output connectors each being connected to a respective conductor terminated in a room of the premises, and a central region having a plurality of module receiving connectors each having a first set of conductors connected to the input electrical connector and a second set of conductors connected to a respective output connector; and,
   a plurality of modules each configured to connect selected ones of the first set of conductors to selected ones of the second set of conductors and each being securable in the central region to pass selected ones of the services to selected ones of the output connectors being connected to one of the rooms within the premises, at least one of the modules being a surge suppressor module for providing signal protection services throughout the system.

2. The signal distribution system of claim 1 wherein the plurality of modules comprises a telephone line one module for connecting telephone line one from the first set of conductors to selected ones of the second set of conductors.

3. The signal distribution system of claim 1 wherein the plurality of modules comprises a telephone line two module for connecting telephone line two from the first set of conductors to selected ones of the second set of conductors.

4. The signal distribution system of claim 1 wherein the plurality of modules comprises a telephone line three module for connecting telephone line three from the first set of conductors to selected ones of the second set of conductors.

5. The signal distribution system of claim 1 wherein the plurality of modules comprises a telephone line four module for connecting telephone line four from the first set of conductors to selected ones of the second set of conductors.

6. The signal distribution system of claim 1 wherein the plurality of modules comprises a video line module for connecting video signals from the first set of conductors to selected ones of the second set of conductors.

7. The signal distribution system of claim 6 wherein the video line module comprises a mating connector on a rear face and a receptacle connector on a front face.

8. The signal distribution system of claim 1 wherein the plurality of modules comprises a data line module for connecting data signals from the first set of conductors to selected ones of the second set of conductors.

9. The signal distribution system of claim 8 wherein the data line module comprises a mating connector on a rear face and a receptacle connector on a front face.

10. The signal distribution system of claim 7 further comprising a video distribution panel for passing a plurality of video signals from the video line module front face connector to the structured wiring network.

11. The signal distribution system of claim 9 further comprising a data distribution panel for passing a plurality of data signals from the data line module front face connector to the structured wiring network.

12. A central distribution panel receiving a plurality of services at an input and having a plurality of outputs each connected to an outlet at a remote location the distribution panel comprising:
    a central region having a plurality of module receiving connectors each having a first portion connected to the input and a second portion connected to one of the plurality of outlets; and,
    a plurality of modules, each being connectable to a respective module receiving connector and configured to bridge a selected service from the first portion to the second portion for sending a selected service to a selected.

13. The central distribution panel of claim 12 wherein one of the plurality of modules further comprises a front face connector for passing a signal from the first portion through the front face of the module.

14. A signal distribution system having a structured wiring network extending between rooms of a premises and connected to a central distribution unit capable of receiving a plurality of services from outside the premises, the system comprising:
    a central distribution panel having at least one input for receiving a service;
    a plurality of outputs each being connected to a respective conductor terminated in a room of the premises;
    and a central region having a plurality of module receiving connectors each having a first set of conductors connected to the input and a second set of conductors connected to a respective output; and,
    a plurality of modules each configured to connect selected ones of the first set of conductors to selected ones of the second set of conductors and each being securable in the central region to pass selected ones of the services to the selected ones of the outputs being connected to one of the rooms within the premises at least one of the modules being an electronic module for providing sensing and control services throughout the system.

15. The signal distribution system of claim 14 wherein the services are provided over a communications medium.

16. The signal distribution system of claim 15 wherein the medium is an optical communications link.

17. The signal distribution system of claim 15 wherein the medium is a wireless communications link.

18. The signal distribution system of claim 15 wherein the medium is an electrical link.

19. The signal distribution system of claim 15 wherein the plurality of modules comprises a telephone line one module for connecting telephone line one from the first set of conductors to selected ones of the second set of conductors.

20. The signal distribution system of claim 15 wherein the plurality of modules comprises a telephone line two module for connecting telephone line two from the first set of conductors to selected ones of the second set of conductors.

21. The signal distribution system of claim 15 wherein the plurality of modules comprises a telephone line three module for connecting telephone line three from the first set of conductors to selected ones of the second set of conductors.

22. The signal distribution system of claim 15 wherein the plurality of modules comprises a telephone line four module for connecting telephone line four from the first set of conductors to selected ones of the second set of conductors.

23. The signal distribution system of claim 15 wherein the plurality of modules comprises a video line module for connecting video signals from the first set of conductors to selected ones of the second set of conductors.

24. The signal distribution system of claim 23 wherein the video line module comprises a mating connector on a rear face and a receptacle connector on a front face.

25. The signal distribution system of claim 15 wherein the plurality of modules comprises a data line module for connecting data signals from the first set of conductors to selected ones of the second set of conductors.

26. The signal distribution system of claim 25 wherein the data line module comprises a mating connector on a rear face and a receptacle connector on a front face.

27. The signal distribution system of claim 25 further comprising a video distribution panel for passing a plurality of video signals from the video line module front face connector to the structured wiring network.

28. The signal distribution system of claim 27 further comprising a data distribution panel for passing a plurality of data signals from the data line module front face connector to the structured wiring network.

29. The signal distribution of claim 14 wherein the plurality of modules comprises a combination module for combining a plurality of services provided at the input into a combined signal at the output connector being connected to one of the rooms within the premises.

* * * * *

UNITED STATES PATENT AND TRADEMARK OFFICE
CERTIFICATE OF CORRECTION

| | |
|---|---|
| PATENT NO. | : 7,005,763 B2 |
| APPLICATION NO. | : 10/087892 |
| DATED | : February 28, 2006 |
| INVENTOR(S) | : Fegley et al. |

It is certified that error appears in the above-identified patent and that said Letters Patent is hereby corrected as shown below:

In column 8, line 19, after "selected" insert --remote location within a premises at least one of the modules being an electronic module for providing sensing and control services throughout the system.--

Signed and Sealed this

Seventeenth Day of October, 2006

JON W. DUDAS
*Director of the United States Patent and Trademark Office*